T. J. COLLINS & R. B. JORDAN.
TIRE CARRIER.
APPLICATION FILED MAY 27, 1918.
1,296,768.
Patented Mar. 11, 1919.
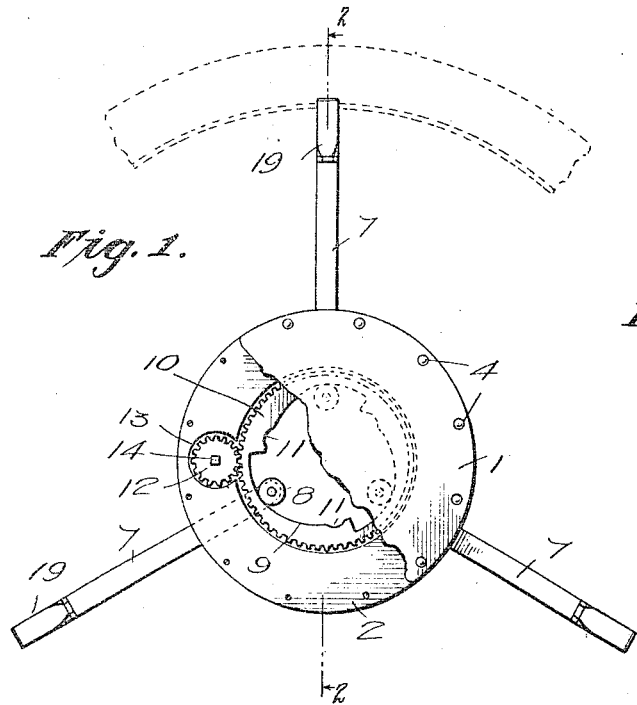
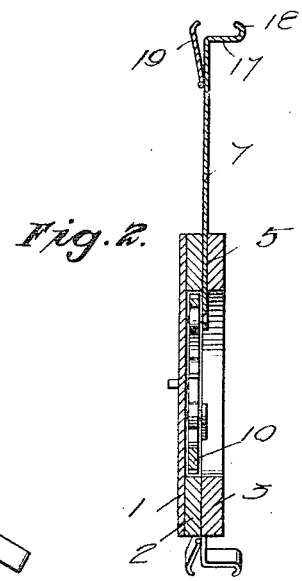
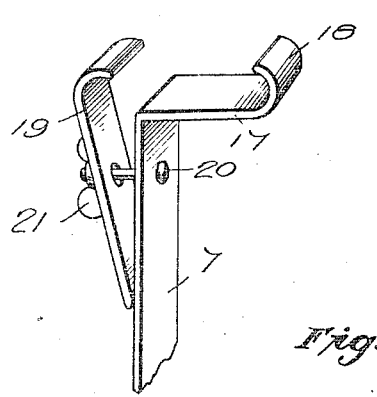
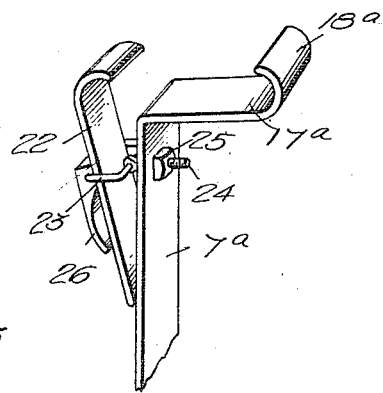
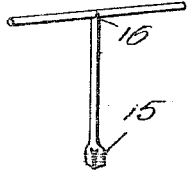
WITNESSES
Thomas J. Collins INVENTORS
R. Blaine Jordan
BY
ATTORNEYS

UNITED STATES PATENT OFFICE.

THOMAS JEFFERSON COLLINS AND ROYAL BLAINE JORDAN, OF BROWNWOOD, TEXAS.

TIRE-CARRIER.

1,296,768.   Specification of Letters Patent.   Patented Mar. 11, 1919.

Application filed May 27, 1918. Serial No. 236,843.

*To all whom it may concern:*

Be it known that we, THOMAS J. COLLINS and R. B. JORDAN, citizens of the United States, and residents of Brownwood, in the county of Brown and State of Texas, have invented certain new and useful Improvements in Tire-Carriers, of which the following is a specification.

Our invention is an improvement in tire carriers, and has for its object to provide a device of the character specified, which may be attached to an automobile to carry an extra tire and which is also provided with mechanism for collapsing a split rim, to permit easy placing or removal of a tire.

In the drawings:

Figure 1 is a front view of the improved carrier with parts broken away,

Fig. 2 is a section on the line 2—2 of Fig. 1, looking in the direction of the arrows adjacent the line, Fig. 3 is a perspective view of one type of rim grip, Fig. 4 is a similar view of another type, and Fig. 5 is a perspective view of a wrench for use with the device.

In the present embodiment of the invention, a disk 1 is provided having upon one face thereof a ring 2, and another ring 3 is arranged on the opposite side of the ring 2 from the disk 1, and the disk and the two rings are secured together as indicated at 4.

The ring 3 has radial grooves 2, three in number in the present instance, and in each groove is mounted to slide an arm 7. Each of these arms has at its inner end a roller 8, and these rollers are adapted to engage cam surfaces 9 on a gear ring 10.

As shown, there are three of these cam surfaces, eccentric to the ring and similar, and each surface has at the high end thereof a notch or recess 11 for engagement by the adjacent roller to provide a lock for the roller. The gear ring is engaged by a pinion 12 which is received in a recess 13 in the ring 2, and this pinion is secured to a shaft 14 having one end extending beyond the disk 1 and square to engage the socket 15 of the T-wrench 16 shown in Fig. 5.

It will be evident that when the gear ring is turned by means of the wrench 16 in the proper direction, the rollers 8 will move up upon the high portions of the eccentrics, and will be moved radially inward, the rollers eventually engaging the notches 11 where they will be locked from accidental displacement.

Any suitable gripping mechanism is provided for the outer ends of the arms 7 to enable them to grip the rim indicated in dotted lines in Fig. 1, in order to collapse or expand the same. Each arm carries one jaw of a clamp, the said jaw being formed by bending the outer end of the arm angular as shown at 17 and providing the said portion with a hook 18. This jaw 17 is the fixed jaw, and the movable jaw 19 is in the form of a plate loosely connected to the arm by means of a bolt 20.

This bolt is rigid with the arm 7 and passes loosely through an opening in the plate 9 intermediate the ends thereof and is engaged by a wing nut 21. By means of the nut the jaw 19 may be forced toward the jaw 17—18 to grip the edges of the rim. In Fig. 4 the arm 7ª has the jaw 17ª—18ª, and the plate 22 which corresponds to the plate 19 passes through a loop 23 connected to the arm 7ª by an eye-bolt 24 and a nut 25. A cam lever 26 is pivoted to the loop, the cam lever engaging the outer face of the plate. When this cam lever is swung downward the jaw will be opened to the widest extent, while when the lever is swung upward into the position of Fig. 4, the jaws will be clamped on the rim. The jaw 22 may be adjusted toward and from the fixed jaw by means of the nut 25.

We claim:

A device of the character specified comprising a central support, a gear ring journaled in the support and having a series of eccentric surfaces at its inner edge, radial arms mounted to slide on the central support and having a gripping mechanism at their outer ends for gripping a wheel rim, rollers journaled on the inner ends of the arms and engaging the eccentric surfaces, a pinion having means for rotating the same and meshing with the ring, each of the eccentric surfaces having a notch near its high end for engagement by the adjacent roller to lock the rollers from accidental displacement.

THOMAS JEFFERSON COLLINS.
ROYAL BLAINE JORDAN.

Witnesses:
W. C. GRIFFIN,
J. F. STEED.